United States Patent [19]

Means

[11] 3,920,974

[45] Nov. 18, 1975

[54] DISCRETE COSINE TRANSFORM SIGNAL PROCESSOR

[75] Inventor: Robert W. Means, San Diego, Calif.

[73] Assignee: The United States of America as represented by the Secretary of the Navy, Washington, D.C.

[22] Filed: Oct. 15, 1974

[21] Appl. No.: 514,706

[52] U.S. Cl. .................................................. 235/152

[51] Int. Cl.[2] .......................................... G06F 15/34

[58] Field of Search ................ 178/DIG. 3, DIG. 22; 235/152, 156; 444/1

[56] References Cited

OTHER PUBLICATIONS

Rabiner, L. R. et al., *The Chirp Z-Transform Algorithm*, in IEEE Trans. Audio and Electroacoustics, AU-17(2): pp. 86–88, June 1969.

*Primary Examiner*—R. Stephen Dildine, Jr.
*Attorney, Agent, or Firm*—Richard S. Sciascia; Ervin F. Johnston; John Stan

[57] ABSTRACT

A processor for performing a discrete cosine transform of an input signal, suitable for real-time television image processing, specifically for obtaining an acceptable picture when the number of bits of information available for describing the picture and/or the channel bandwidth are severely limited, comprising: two complex read-only memories, an input and output read-only memory, each containing a predetermined number of data points arranged in a predetermined manner; two complex multipliers, an input and an output multiplier, each having an input from one of the read-only memories, an input which is connectable to the external signal of N data values which is to be transformed discretely and cosinusoidally; a complex transversal filter, having 2N-1 taps, the input to the filter being the output of the input multiplier; the output of the transform processor comprising the output of the output multiplier.

4 Claims, 1 Drawing Figure

GENERAL DISCRETE COSINE TRANSFORM IMPLEMENTED VIA A CZT USING A TRANSVERSAL FILTER.

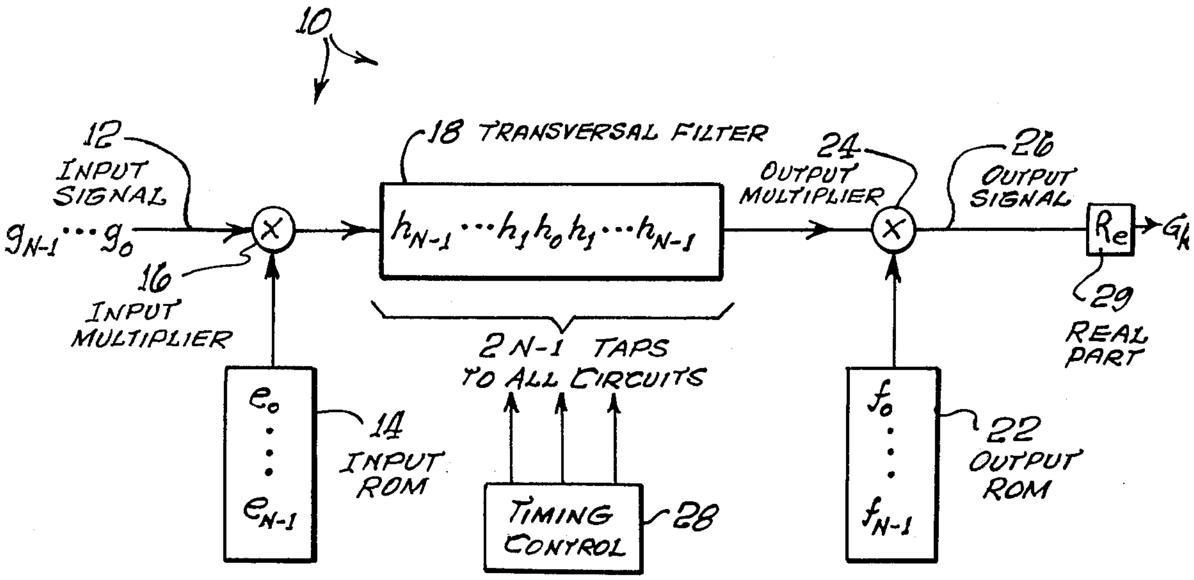
GENERAL DISCRETE COSINE TRANSFORM IMPLEMENTED VIA A CZT USING A TRANSVERSAL FILTER.

DISCRETE COSINE TRANSFORM SIGNAL PROCESSOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

This invention relates to apparatus capable of performing a discrete cosine transform with lightweight, low-cost, high-speed hardware suitable for real-time television image processing.

Theoretical work and simulation studies have shown that the discrete cosine transform is nearly optimum for image redundancy reduction. The discrete cosine transform may be interpreted as a discrete Fourier transform of a symmetrized version of the image data block. Prior art means for performing the discrete Fourier transform, such as Fast Fourier Transform (FFT) hardware or chirp-z transform (CZT) hardware may also be used to perform the discrete cosine transform. The CZT devices are to be preferred to the FFT devices since the data block size is not restricted to be a highly composite number for the CZT, and also the CZT is about $\log_2 N$ times faster (where N is the transform block length), using components with the same operation rate. However, the size of the transform block for the CZT is limited by the number of independent taps in the transversal filter. A filter length of 4N−3 taps has previously been required to implement a discrete cosine transform of an N-point data block. This invention implements a discrete cosine transform of length N using only filters with 2N−1 taps, thus either reducing the filter length required or permitting a longer block to be transformed with filters of a given length.

One of the principal advantages of this invention is the ability to perform a discrete cosine transform on longer blocks with filters having a given number of taps. Another principal advantage of this invention is the ability to perform a discrete cosine transform on a block of data without explicitly symmetrizing and storing the data in a memory.

The transversal filters of this invention may be acoustic surface-wave tapped delay lines, charge transfer tapped delay lines, or other tapped delay lines, or digital correlators. Similarly, the function generators which provide the discrete chirps may be read-only memories, acoustic surface wave filters, charge transfer devices, or digital shift registers.

SUMMARY OF THE INVENTION

This invention relates to a signal processor capable of computing a discrete cosine transform (DCT) of a finite sampled input signal at high speed with lightweight, low-cost, hardware.

The discrete cosine transform of an input signal may be computed in prior art by symmetrizing the input signal, storing it in a memory, and computing the discrete Fourier transform of the resultant signal. This method requires a signal memory, a method of symmetrizing the data set, and a device to compute the discrete Fourier transform of the symmetrized signal, which has twice as many terms as the original unsymmetrized signal.

The invention makes use of the chirp-Z algorithm to compute the discrete cosine transform via a small number of multipliers, summers, and transversal filters. No memory of the input data is required, and the devices operate at high speeds suitable for television signal processing.

The input signal consists of N values of a sampled signal. These data values are multiplied in a multiplier by the values stored in a read-only memory which contains the values $\exp(-i\pi n^2/(2N-1))$ for $1 \le n \le N-1$ and has the value of 0.5 for $n=0$. The result is inserted in a transversal filter with impulse response $\exp(i\pi n^2/(2N-1))$ for $-N+1 \le n \le N-1$. The output of the transversal filter is inserted in another multiplier, where it is multiplied by the reference function stored in another read-only memory which has values $\exp(-i\pi n^2/(2N-1))$ for $0 \le n \le N-1$. The real value of the output of the multiplier is the cosine transform of the input signal as defined by the equation $$G_k = -g_0 + 2\,Re \sum_{n=0}^{N-1} g_n \cos(2\pi kn/(2N-1)) \quad 0 \le k \le N-1$$

This transformation is called the odd discrete cosine transform (ODCT), since the implied symmetry of the signal is obtained by reflecting the signal about the data value $g_0$ to obtain a signal of $2N-1$ values.

There also exists an even cosine transform defined by the equation $$G_k = 2 \sum_{n=0}^{N-1} g_n \cos(2\pi k(n+½)/2N) \quad 0 \le k \le N-1$$

The even discrete cosine transform (EDCT) can be computed by the same kind of components already described. The values of the read-only memories, and the values of the impulse response of the transversal filter, respectively, must be changed to $$\exp(-i\pi(n+½)^2/2N) \quad 0 \le n \le N-1$$
$$\exp(-i\pi n^2/2N) \quad 0 \le n \le N-1$$
$$\exp(i\pi(n+½)^2/2N \quad -N \le n \le N-1$$

The real part of the output is then the even cosine transform.

Among the advantages of the invention are that it requires no explicit symmetrization of the original signal and that it requires no memory of the original signal. Another advantage is that the transversal filter need only be of length $2N-1$. Another advantage is that it operates in real time at high speeds.

STATEMENT OF THE OBJECTS OF INVENTION

An object of the invention is to provide a processor useful for television image processing at high speed with lightweight hardware.

Another object of the invention is to provide a processor which requires no reflection or memory of the original signal.

Other objects, advantages and novel features of the invention will become apparent from the following detailed description of the invention when considered in conjunction with the accompanying drawing wherein:

BRIEF DESCRIPTION OF THE DRAWING

FIG. 1 is a block diagram of a signal processor for taking the discrete cosine transform of a sampled input signal.

DESCRIPTION OF THE PREFERRED EMBODIMENT

Referring now to FIG. 1, therein is shown a signal processor 10 for performing the discrete cosine transform of an input signal 12 having N samples, comprising two complex read-only memories, an input read-only memory 14 and an output read-only memory 22, each containing a total number N of data points arranged in a predetermined manner. Two complex multipliers, an input multiplier 16 and an output multiplier 24, each have an input from one of the read-only memories, an input which is connectable to the external signal 12 which is to be transformed discretely and cosinusoidally. A transversal filter 18 has $2N-1$ taps, the input to the filter being the output of the input multiplier 16. The output of the signal processor 10 comprises the real part 29 of the output of the output multiplier 24.

The processor 10 may further comprise means 28 connected to the read-only memories, 14 and 22, multipliers, 16 and 24, and filter 18, for controlling the timing or sequencing of these three types of circuits.

In the processor 10 for performing an odd discrete cosine transform of an input signal 12, the input read-only memory 14 may have stored within it data samples corresponding to 0.5 for $n = 0$ and $$e^{-\frac{i\pi n^2}{2N-1}} \quad \text{for } 1 \leq n \leq N-1;$$

the output read-only memory 22 has stored within it reference samples corresponding to $$e^{-\frac{i\pi n^2}{2N-1}}, \quad \text{for } 0 \leq n \leq N-1;$$

and the transversal filter 18 has an impulse response corresponding to $$e^{+\frac{i\pi n^2}{2N-1}},$$

for $-N+1 < n < N-1$. The signal processor 10 thereby performs an odd discrete cosine transform of the input signal.

Discussing now the theory behind the invention, two different types of discrete cosine transform (DCT) are useful for reduced redundancy television image transmission. Both are obtained by extending a length N data block to have even symmetry, taking the discrete Fourier transform (DFT) of the extended data block, and saving N terms of the resulting DFT. Since the DFT of a real even sequence is a real even sequence, either DCT is its own inverse if a normalized DFT is used.

The "Odd DCT" (ODCT) extends the length N data block to length $2N-1$, with the middle point of the extended block as a center of even symmetry. The "Even DCT" (EDCT) extends the length N data block to length 2N, with a center of even symmetry located between the two points nearest the middle. For example, the odd length extension of the sequence A B C is C B A B C, and the even length is C B A A B C. In both cases, the symmetrization eliminates the jumps in the periodic extension of the data block which would occur if one edge of the data block had a high value and the other edge had a low value; in effect it performs a sort of smoothing operation with no loss of information. It will be noted that the terms "odd" and "even" in the abbreviations ODCT and EDCT refer only to the length of the extended data block — in both cases the extended data block has even symmetry.

Both types of DCT may be implemented using compact, high speed, serial-access hardware, in structures similar to those previously described in the prior art for the chirp-z transform (CZT) implementation of the DFT. Reference is specifically directed to Means, R. W., Whitehouse, H. J., Speiser, J. M., *Image Transmission Via Spread Spectrum Techniques*, ARPA Quarterly Technical Report, Mar. 1–June 1, 1973 Order Number 2303, Code Number 3G10, and the same three authors, *Image Transmission Via Spread Spectrum Techniques*, ARPA Quarterly Technical Report, June 1–Oct. 1, 1973, the same order number and the same code number.

Describing the odd discrete cosine transform (ODCT) first, let the data sequence 12, in FIG. 1, be $g_0, g_1, \ldots, g_{N-1}$. Generally, the $g$ terms comprise sampled analog terms, which may be real or imaginary, or possibly complex. The ODCT of $g$ is defined as $$G_{ok} = \sum_{j=-(N-1)}^{N-1} g_j e^{-\frac{i2\pi jk}{2N-1}}$$

$$\text{for } k = 0, 1, \ldots, N-1 \qquad (1)$$

$$\text{where } g_{-j} = g_j \text{ for } j = 0, 1, \ldots, N-1. \qquad (2)$$

By straightforward substitution it may be shown that $$G_{ok} = 2\, Re \sum_{j=0}^{N-1} \tilde{g}_j e^{-\frac{i2\pi jk}{N-1}} \qquad (3)$$

where $\tilde{g}_j$ is defined by equation (4).

$$\tilde{g}_j = \begin{Bmatrix} .5\, g_0, & j = 0 \\ g_j, & j = 1 \ldots, N-1 \end{Bmatrix} \qquad (4)$$

The identity (5) may be used to obtain the CZT form of the ODCT shown in equation (6).

$$2jk = k^2 + j^2 - (k-j)^2 \qquad (5)$$

$$G_{ok} = 2\, Re \left\{ e^{-\frac{i\pi k^2}{2N-1}} \sum_{j=0}^{N-1} \left[ e^{-\frac{i\pi j^2}{2N-1}} \tilde{g}_j \right] e^{\frac{i\pi (k-j)^2}{2N-1}} \right\} \qquad (6)$$

Discussing now the even discrete cosine transform (EDCT) of $g$, this is defined by equation (7), where the extended sequence is defined by equation (8).

$$G_{ek} = e^{-\frac{i\pi k}{2N}} \sum_{j=-N}^{N-1} g_j e^{-\frac{i2\pi jk}{2N}}$$

for $k = 0, 1, \ldots, N-1$ (7)

$g_{-1-j} = g_j$; for $j = 0, 1, \ldots, N-1$ (8)

If the mutually complex conjugate terms in equation (7) are combined, then equation (9) results. Equation (9) may be viewed as an alternate way of defining the EDCT.

$$G_{ek} = 2\,Re\left\{ e^{-\frac{i\pi k}{2N}} \sum_{j=0}^{N-1} g_j e^{-\frac{i2\pi jk}{2N}} \right\} = 2 \sum_{j=0}^{N-1} g_j \cos\left[\frac{2\pi(j+.5)k}{2N}\right] \quad (9)$$

Equation (9) may be put in the chirp-z transform (CZT) formats given in equation (10)

$$G_{ek} = 2\,Re\left\{ e^{-\frac{i\pi k}{2N}} e^{-\frac{i\pi k^2}{2N}} \sum_{j=0}^{N-1} \left[ g_j e^{-\frac{i\pi j^2}{2N}} \right] e^{\frac{i\pi(k-j)^2}{2N}} \right\} \quad (10)$$

Discussing the general DFT of length $N$, as defined by equation (11) it may be computed by a CZT defined by equations (12) and (13), as shown in the embodiment 10 of FIG. 1.

$$G_k = \sum_{j=0}^{N-1} g_j e^{-\frac{i2\pi jk}{N}} \quad (11)$$

$$G_k = f_k \sum_{j=0}^{N-1} [g_j e_j]\, h_{k-j} \quad (12)$$

$$h_s = e^{\frac{i\pi s^2}{N}} = h_{-s} \quad (13)$$

It will be noted that the postmultiplier 22 of FIG. 1 is ready to produce the first transform point when the first term of the input signal 12 to the filter 18 is lined up with the central tap, labelled $h_0$. The first term $G_0$ of the output signal is $\sum_{n=0}^{N-1} g_n$.

If the ODCT is viewed as a DFT using equation (1), then it may be implemented using the structure 10 shown in FIG. 1 and the required filter length is $4N-3$.

The EDCT as defined by equation (7) may be implemented similarly by changing the postmultiplier weights to $$e^{-\frac{i\pi(k^2+k)}{2N}}$$

It should be noted that a twofold reduction in the required length of the filter and read-only memories is possible when the ODCT is computed via equation (6). A similar conclusion holds for the EDCT computed via equation (10).

Obviously, many modifications and variations of the present invention are possible in the light of the above teachings. It is therefore to be understood that within the scope of the appended claims the invention may be practiced otherwise than as specifically described.

What is claimed is:

1. A signal processor for performing the discrete cosine transform of an input signal having N samples, comprising:

two complex read-only memories, an input and output read-only memory, each containing a total number N of data points arranged in a predetermined manner;

two complex multipliers, an input and an output multiplier, each having an input from one of the read-only memories, the input multiplier having an input which is connectable to the external signal which is to be transformed discretely and cosinusoidally; and a complex transversal filter, having $2N-1$ taps, the input to the filter being the output of the input multiplier;

the output of the transform processor comprising the real part of the output of the output multiplier.

2. The processor, according to claim 1, further comprising:

means connected to the read-only memories, multipliers and filter for controlling the timing or sequencing of these three types of circuits.

3. The processor for performing a discrete cosine transform of an input signal according to claim 1, wherein:

the input read-only memory has stored within it data samples corresponding to 0.5 for $n=0$ and $$e^{-\frac{i\pi n^2}{2N-1}}, \quad \text{for } 1 \leq n \leq N-1;$$

the output read-only memory has stored within it reference samples corresponding to $$e^{-\frac{i\pi n^2}{2N-1}}, \quad \text{for } 0 \leq n \leq N-1; \text{ and}$$

the transversal filter has an impulse response corresponding to $$e^{\frac{i\pi n^2}{2N-1}},$$

for $-N+1 < n < N-1$;

the signal processor thereby performing an odd discrete cosine transform of the input signal.

4. The processor for performing a discrete cosine transform of an input signal according to claim 1, wherein:

the input read-only memory has stored within it data samples corresponding to 0.5 for $n=0$ and $$e^{-\frac{i\pi(n+\frac{1}{2})^2}{2N}}, \text{for } 0 \leq n \leq N-1;$$

the output read-only memory has stored within it reference samples corresponding to $$e^{-\frac{i\pi n^2}{2N}}, \text{for } 0 \leq n \leq N-1; \text{ and}$$

the transversal filter has an impulse response corresponding to $$e^{\frac{i\pi(n+\frac{1}{2})^2}{2N}}$$

for $-N<n<N-1$;

the signal processor thereby performing an even discrete cosine transform of the input signal.

* * * * *